(12) United States Patent
Bellows et al.

(10) Patent No.: US 8,918,552 B2
(45) Date of Patent: Dec. 23, 2014

(54) MANAGING MISALIGNED DMA ADDRESSES

(75) Inventors: Gregory Howard Bellows, Austin, TX (US); Jason N. Dale, Austin, TX (US); Dean Joseph Burdick, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 516 days.

(21) Appl. No.: 12/257,573

(22) Filed: Oct. 24, 2008

(65) Prior Publication Data
US 2010/0106880 A1 Apr. 29, 2010

(51) Int. Cl.
*G06F 13/28* (2006.01)
*G06F 5/01* (2006.01)
*G06F 12/10* (2006.01)

(52) U.S. Cl.
CPC ............ *G06F 13/28* (2013.01); *G06F 12/1081* (2013.01); *G06F 5/01* (2013.01)
USPC .............................................. 710/22; 710/26

(58) Field of Classification Search
CPC ........ G06F 13/28; G06F 5/01; G06F 12/1081
USPC .................................................... 710/22, 26
See application file for complete search history.

(56) References Cited

U.S. PATENT DOCUMENTS

| | | | | |
|---|---|---|---|---|
| 5,701,517 A | * | 12/1997 | Carpenter | 710/66 |
| 6,330,623 B1 | * | 12/2001 | Wu et al. | 710/23 |
| 6,405,233 B1 | * | 6/2002 | Mathews et al. | 708/670 |
| 6,854,025 B2 | * | 2/2005 | Knight et al. | 710/22 |
| 7,330,914 B2 | * | 2/2008 | Inogai | 710/22 |
| 7,620,746 B2 | * | 11/2009 | Go et al. | 710/22 |
| 2002/0062408 A1 | * | 5/2002 | Jahnke et al. | 710/22 |
| 2003/0046458 A1 | * | 3/2003 | Morishima | 710/22 |

* cited by examiner

*Primary Examiner* — Eric Oberly
(74) *Attorney, Agent, or Firm* — James L. Baudino

(57) ABSTRACT

A system and method operable to manage misaligned direct memory access (DMA) data transfers is provided. This method involves determining a delta between N bytes of data to be copied from within a local side buffer (source location) to a remote buffer (destination location). After the delta is determined a tail of the same length is copied to temporary storage. Then the N bytes of data on the local side buffer minus the tail will be shifted to align the N bytes of data to be copied from within the local side buffer to the starting address of the destination location in the remote buffer. The preshifted N bytes of data within the local side buffer may be DMA transferred to the remote buffer. The tail transferred to temporary storage may then be copied from temporary storage to the remote buffer.

19 Claims, 9 Drawing Sheets

MANAGING MISALIGNED DMA ADDRESSES

BACKGROUND OF THE INVENTION

The present disclosure relates generally to messaging between processing modules, and more particularly, the management of unaligned Direct Memory Access (DMA) transfers of data.

Direct Memory Access (DMA) allows data to move directly from the memory of one computer into that of another without involving either one's operating system. This permits high-throughput, low-latency networking, which is especially useful in massively parallel computer clusters.

In systems with small amounts of memory. Some heterogeneous memory architectures have restrictions on the address and size alignment of DMAs. These architectures may enforce restrictions that require both the source and destination addresses to have the same byte offset within a certain alignment window. In addition, the DMA size may also be restricted to alignment rules based on the address alignment.

These alignment restrictions can cause difficulty. Careful attention must be taken to insure program adherence to these alignment restrictions in both address and size.

Existing solutions for "re-aligning" the users data presents two main obstacles. Existing solutions use conventional memory copy techniques, which do not typically scale well as larger size transfers require large amounts of copying, which negatively impacts performance. To compound matters, in small memory systems, memory is at a premium, so allocating comparable sized storage for copying it not always possible or logical because it would require twice as much memory. For example, using a full size copy buffer to perform a 32 KB DMA would require 32 KB plus the alignment size. Given the copy buffer size the operation would actually require a little more than 64 KB to do a 32 KB DMA.

Another solution would be to use a single smaller sized buffer to re-use numerous times to do a larger DMA. The dependency on this single buffer would cause the DMA to become serialized making it far more inefficient.

BRIEF SUMMARY OF THE INVENTION

Embodiments of the present disclosure are directed to systems and methods that are further described in the following description and claims. Advantages and features of embodiments of the present disclosure may become apparent from the description, accompanying drawings and claims.

Embodiments of the present disclosure provide a system and method operable to manage misaligned direct memory access (DMA) data transfers. In one embodiment this method involves determining a delta between N bytes of data to be copied from within a local side buffer (source location) to a remote buffer (destination location). After the delta is determined a tail of the same length is copied to temporary storage. Then the N bytes of data on the local side buffer minus the tail will be shifted to align the N bytes of data to be copied from within the local side buffer to the starting address of the destination location in the remote buffer. The pre-shifted N bytes of data within the local side buffer may be DMA transferred to the remote buffer. The tail transferred to temporary storage may then be copied from temporary storage to the remote buffer.

Other embodiments may further address the need to return the local side buffer to the buffer's original state. This involves unshifting the pre-shifted N bytes of data (i.e. the N bytes of data on the local side buffer minus the tail). The tail previously copied from the local side buffer to temporary storage may then be returned to the tail's original location in the local side buffer.

Yet another embodiment provides a system operable to manage misaligned DMA data. This system includes a primary processing device, a first memory storage location, a second memory storage location, a temporary memory storage location and a data bus. The data bus couples the processing device and memory storage locations. The primary processing device may coordinate DMA data transfers between the first memory storage location and the second memory storage location using temporary storage. The primary processing device determines the delta between the starting address of N bytes of data to be copied from within the first memory storage location to the second storage location. A data tail, typically having a length equal to that of the delta, may then be copied to temporary storage. The N bytes of data minus the tail may be shifted within the first memory storage location. The tail is not shifted in order to avoid overrunning data written beyond the N bytes of the first memory storage location. This allows the N bytes of data that have been pre-shifted to be aligned and transferred from within the first memory storage location to the second memory location. The tail may be transferred separately from temporary storage to the second memory storage location to complete the transfer. The processing device may then restore the first memory storage location by unshifting the pre-shifted data within the first memory storage location and then restoring the tail to the first memory storage location from the temporary storage location.

Another method provided in accordance with the present disclosure is similar to those described above. However, prior to shifting data, the number of bytes of data to be copied from the local side or first storage location may be compared to the size of temporary storage. When the size of temporary storage compares favorably to the number of bytes to be transferred (i.e. number of bytes to be transferred fit within temporary storage), shifting of data may be avoided by simply copying the data from the first location to temporary storage and then the destination location. When the comparison is unfavorable the data may be divided into a tail and a number of bytes to be shifted within the first or source location as described previously.

BRIEF DESCRIPTION OF THE SEVERAL VIEWS OF THE DRAWINGS

For a more complete understanding of the present disclosure and the advantages thereof, reference is now made to the following description taken in conjunction with the accompanying drawings in which like reference numerals indicate like features and wherein.

DETAILED DESCRIPTION OF THE INVENTION

Preferred embodiments of the present disclosure are illustrated in the FIGs., like numerals being used to refer to like and corresponding parts of the various drawings.

Embodiments of the present disclosure provide a system and method operable to manage misaligned direct memory access (DMA) data transfers that substantially address the above identified needs. In one embodiment this method involves determining a delta between N bytes of data to be copied from within a local side buffer (source location) to a remote buffer (destination location). After the delta is determined a tail of the same length is copied to temporary storage. Then the N bytes of data on the local side buffer minus the tail will be shifted to align the N bytes of data to be copied from within the local side buffer to the starting address of the destination location in the remote buffer. The pre-shifted N bytes of data within the local side buffer may be DMA transferred to the remote buffer. The tail transferred to temporary storage may then be copied from temporary storage to the remote buffer.

Other embodiments may further address the need to return the local side buffer to the buffer's original state. This involves unshifting the pre-shifted N bytes of data (i.e. the N bytes of data on the local side buffer minus the tail). The tail previously copied from the local side buffer to temporary storage may then be returned to the tail's original location in the local side buffer. The transfer of the tail via temporary storage prevents over running data within the local side buffer.

Figure 1:
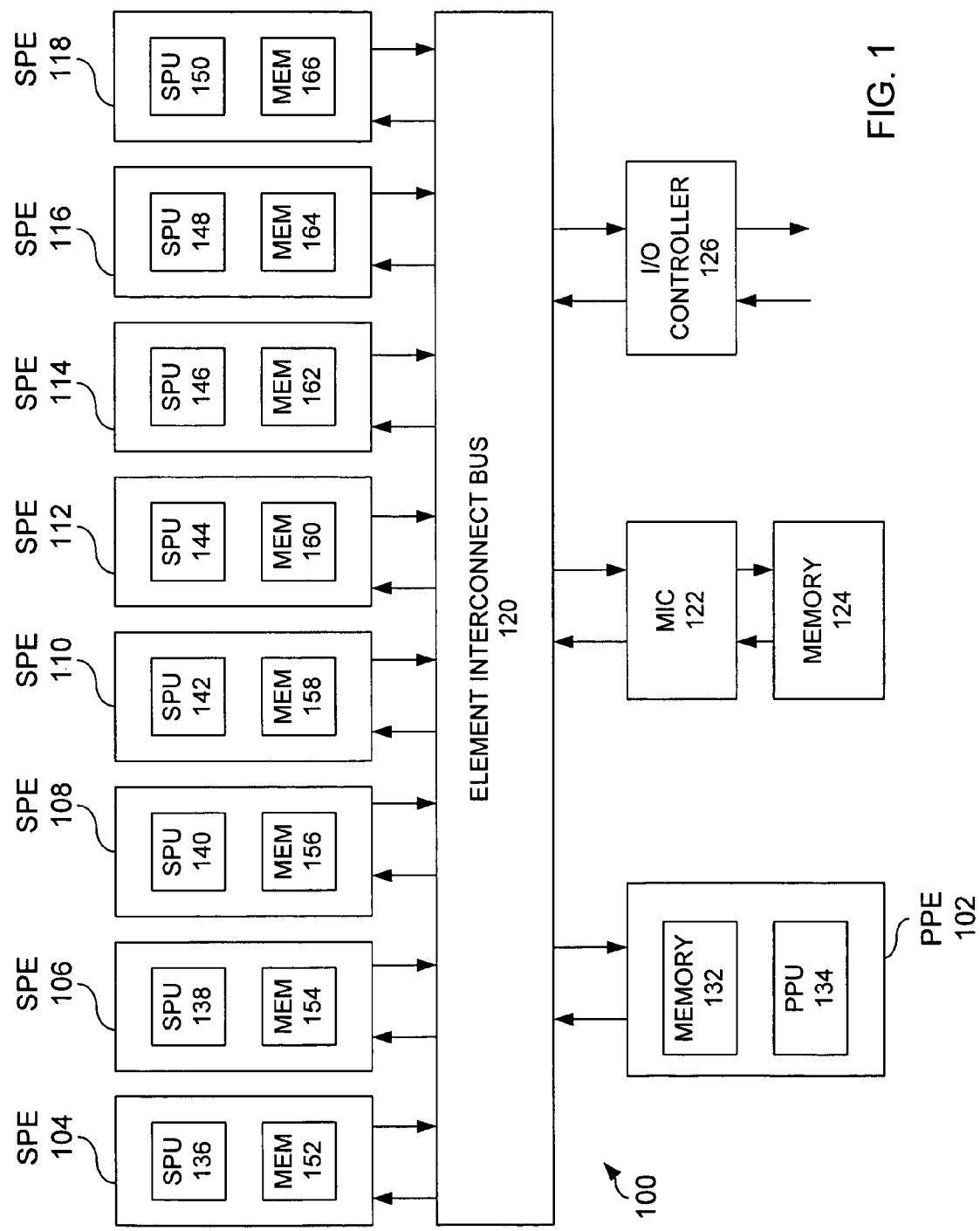
FIG. 1 provides a block diagram of a microprocessor that employs embodiments of the present disclosure to perform misaligned DMA transfers.

FIG. 1 provides a block diagram of a microprocessor that employs embodiments of the present disclosure to perform misaligned DMA transfers. Such a microprocessor bridges the gap between conventional desktop processors and more specialized high-performance processors, such as the graphics-processors (GPUs). Embodiments may be found as a component in current and future digital distribution systems. As such embodiments may be utilized in high-definition displays and recording equipment, as well as computer entertainment systems for the HDTV era. Additionally the processor may be suited to digital imaging systems (medical, scientific, etc.) as well as physical simulation (e.g., scientific and structural engineering modeling).

Microprocessor 100 includes a power processing element (PPE) 102, synergistic processing elements (SPEs) 104, 106, 108, 100, 112, 114 and 118, element interconnect bus (EIB) 120, a memory interface controller (MIC) 122, memory 124 and I/O controller 126. The PPE 102 further includes a primary processing unit (PPU) 134 and memory 132. The SPEs each include a synergistic processing unit (SPU) 136, 138, 140, 142, 144, 146, 148 and 150 and local memory 152, 154, 156, 158, 160, 162, 164, 166. PPE 102 serves as the main processor coordinates a number of functional co-processors (where 8 SPEs 104-118 are shown). The high-bandwidth data bus (EIB 120) couples PPE 102, input/output elements 126 and the SPEs 104-118.

To achieve the high performance needed for mathematically intensive tasks, such as but not limited to decoding/ encoding MPEG streams, generating or transforming three-dimensional data, or undertaking Fourier analysis of data, Microprocessor 100 couples the SPEs 104-118 and PPE 102 via EIB 120 to give access, via cache coherent DMA (direct memory access), to both main memory and to other external data storage. To facilitate the overlap of computations and data transfer, each of the nine processing elements (PPE 102 and SPEs 104-118) may be equipped with a DMA engine.

Since the SPE's load/store instructions may access only the SPE's own local memory, each SPE entirely depends on DMAs to transfer data to and from the main memory and other SPE's 104-118 local memories. A DMA operation can transfer either a single block area, or a list of such blocks. One design features of the microprocessor 100 is the use of DMAs as a central means of intra-chip data transfer, with a view to enabling maximal asynchrony and concurrency in data processing.

PPE 102 has control over the SPEs 104-118 and can start, stop, interrupt, and schedule processes running on the SPEs 104-118. To this end PPE 102 has additional instructions relating to control of the SPEs 104-118. Unlike SPEs 104-118, PPE 102 can read and write to the main memory and the local memories of SPEs 104-118 through the standard load/store instructions. SPEs 104-118 may not be fully autonomous and require PPE 102 to prime the SPE before each SPE can do any useful work. The use of DMA as a method of data transfer and the limited local memory footprint of each SPE pose major challenges.

PPE 102 and the bus architecture include various modes of operation giving different levels of memory protection, allowing areas of memory to be protected from access by specific processes running on the SPEs 104-118 or PPE 102. Both the PPE and SPE may be based on reduced instruction set computing (RISC) architectures.

In one embodiment, PPE 102 may be a multithreaded core acting as the controller for the eight SPEs 104-118 shown. SPEs 104-118 handle most of the computational workload. In one embodiment, PPE 102 may work with conventional operating systems due to similarity to other 64-bit PowerPC processors, while the SPEs 104-118 may be designed for vectorized floating point code execution.

PPE 102 includes a Power Processing Unit (PPU) 134 connected to memory 132. PPE 102 increases the performance/power ratio as well as the performance/area ratio. The PPU in one embodiment is a dual-issue, in-order processor with dual-thread support.

In one typical usage scenario, the system will load the SPEs 104-118 with small programs, chaining SPEs 104-118 together to handle individual tasks or steps within a complex operation. For instance, a set-top box might load programs for reading a DVD, video and audio decoding, and display, and the data would be passed off from SPE to SPE until finally ending up on the TV. Another possibility is to partition the input data set and have several SPEs 104-118 performing the same kind of operation in parallel. Element Interconnect Bus (EIB 120)

EIB 120 is a communication bus internal to the Microprocessor 100 which couples the various on-chip system elements: PPE 102 processor, the memory controller (MIC), the eight SPE coprocessors, and off-chip I/O interfaces. The EIB 120 may also include an arbitration unit which functions as a set of traffic lights. In some documents IBM refers to EIB 120 bus participants as 'units'.

DMA supports networked computing by enabling data transfer directly to or from application memory, eliminating the need to copy data between application memory and the data buffers in the operating system. Such transfers require no work to be done by CPUs, caches, or context switches, and transfers continue in parallel with other system operations.

When an application performs a DMA Read or Write request, the application data is delivered directly, reducing latency and enabling fast message transfer.

Embodiments of this disclosure provide a mechanism for efficiently performing unaligned (i.e. misaligned) DMA transfers in systems which may only have small amounts of memory. Some heterogeneous memory architectures have restrictions on the address and size alignment of DMAs. These architectures may enforce restrictions that require both the source and destination addresses to have the same byte offset within a certain alignment window. In addition, the DMA size may also be restricted to alignment rules based on the address alignment.

These alignment restrictions can be cumbersome to program around and cause programming difficulty. Careful attention must be taken to insure program adherence to these alignment restrictions in both address and size.

Figure 2:
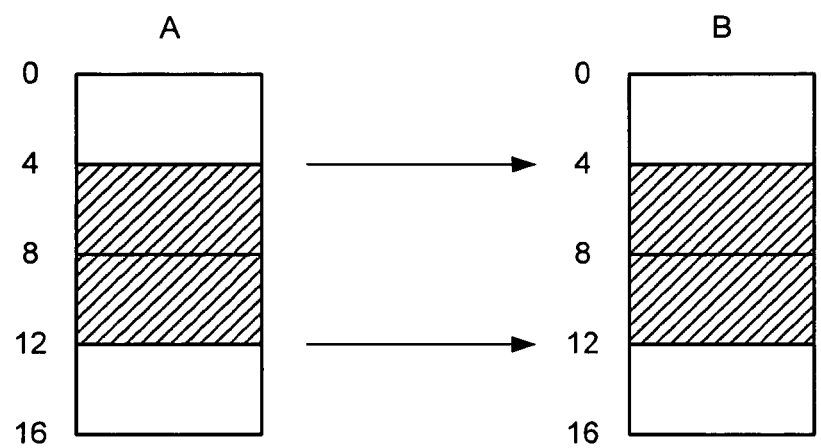
FIG. 2 illustrates a prior art DMA transfer where aligned data is transferred from the shaded area of memory location A to the aligned shaded area of memory location B.

FIG. 2 illustrates DMA transfer where the shaded area of memory location A is transferred to the shaded area of memory location B. Prior systems require that the starting locations of the source and destination be aligned. In instances where data source and destination locations may be misaligned, prior solutions are both memory intensive and complex. Embodiments of the present disclosure provide a new methodology for successfully managing such DMA.

Existing solutions for "re-aligning" the users data presents two main obstacles. Existing solutions use conventional memory copy techniques, which do not typically scale well as larger size transfers require large amounts of copying, which negatively impacts performance. To compound matters, in small memory systems, memory is at a premium, so allocating comparable sized storage for copying is not always possible or logical because copying would require twice as much memory. For example, using a full size copy buffer to perform a 32 KB DMA would require 32 KB plus the alignment size. Given the copy buffer size the operation would actually require a little more than 64 KB to do a 32 KB DMA.

Another solution employs a single smaller sized buffer which is re-used numerous times to perform larger DMAs. The dependency on this single buffer causes the DMA to become serialized making the solution far more inefficient.

This disclosure solves the problem of alignment restrictions by re-aligning the local side data to match that of the remote location. The local side data is shifted within the local side buffer to eliminate the need to allocate a large copy buffer. Shifting of data is done using single instruction multiple data (SIMD) operations for optimal performance.

Figure 3A:
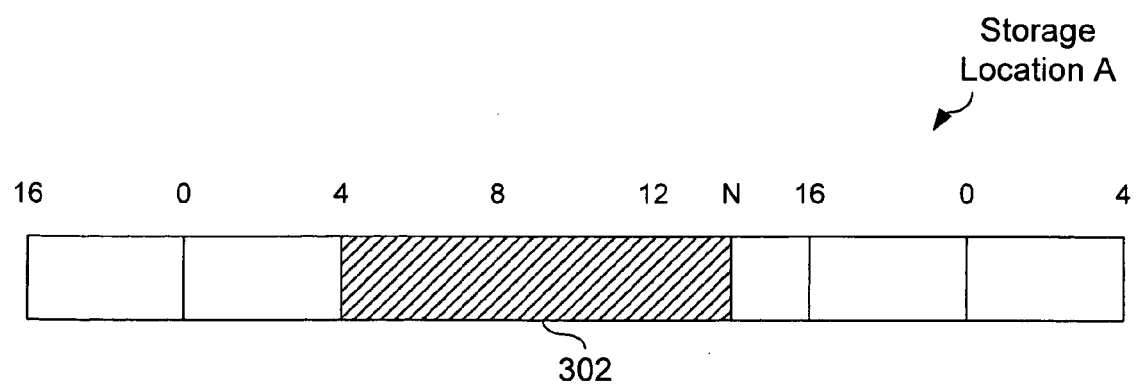
FIGS. 3A, 3B, 3C, 3D and 3E may be used to describe operations associated with a misaligned DMA transfer in accordance with embodiments of the present disclosure where a PUT is performed from storage location A to storage location B.
Figure 3A:
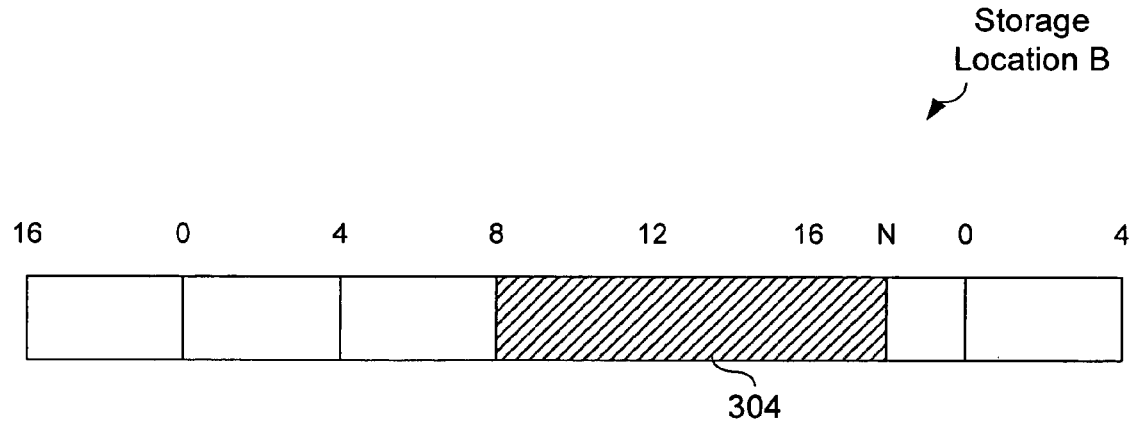
Figure 3B:
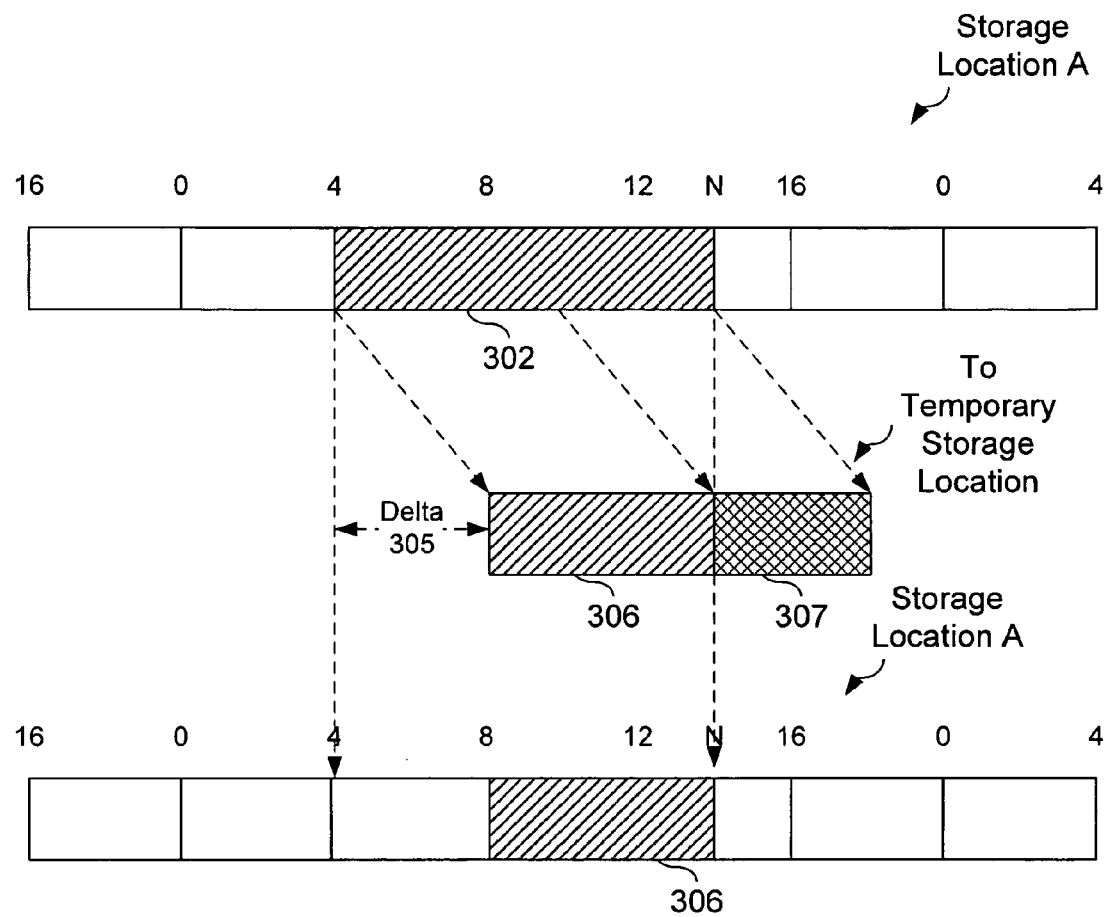
Figure 3C:
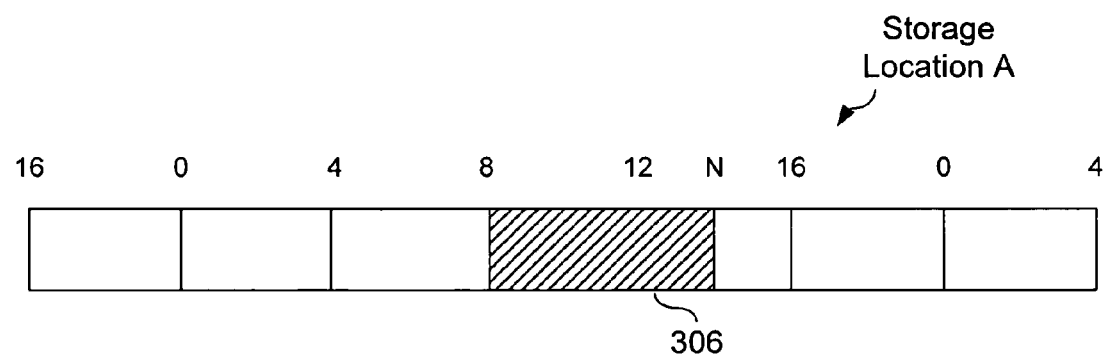

FIGS. 3A, 3B, 3C, 3D and 3E may be used to describe operations associated with a misaligned DMA transfer in accordance with embodiments of the present disclosure. FIG. 3A shows a number of bytes, data block 302, beginning at starting location 4 and ending at location N, to be transferred from storage location A to storage location B. Data block 302 may be transferred from within storage location A to a different starting location as block 304 within storage location B. FIG. 3B shows that delta 305 between the starting location of the data within storage location A and the starting location within storage location B may be determined. Next data block 302 may be divided into a first portion 306 where the original data is shifted and a second portion or tail 307 which is sent to temporary storage. Data block 306, the first portion of data block 302 having length N minus the delta between starting locations, is shifted to the right as shown in FIG. 3C. The shift results in storage location A having the pre-shifted data block 306 aligned to the beginning point of the destination location within storage location B.

Figure 3D:
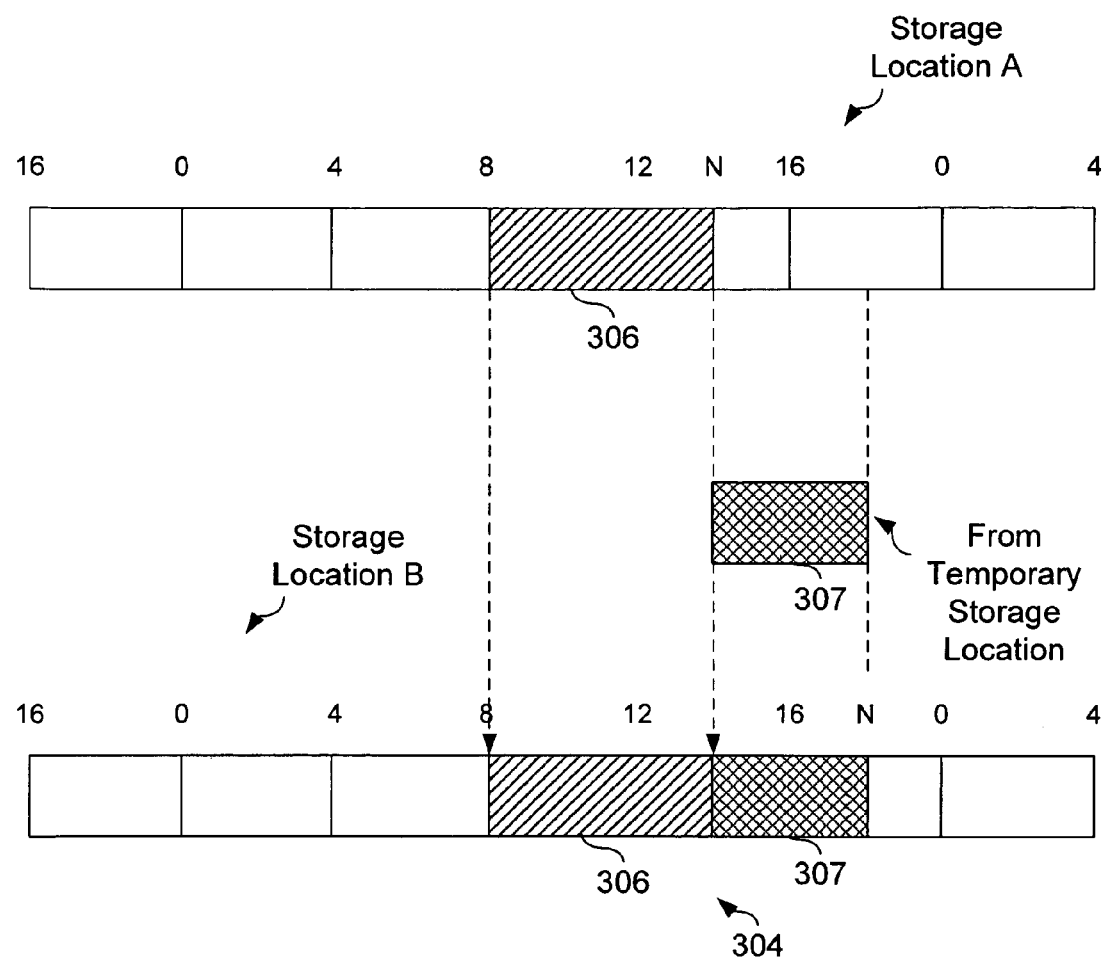

FIG. 3D shows that the pre-shifted data block 306 may be transferred via DMA to the new location within storage location B. Data block 307, i.e., the tail in temporary storage may also be written to storage location B such that now data block 302 has been rewritten in two pieces as data block 304 within storage location B.

Figure 3E:
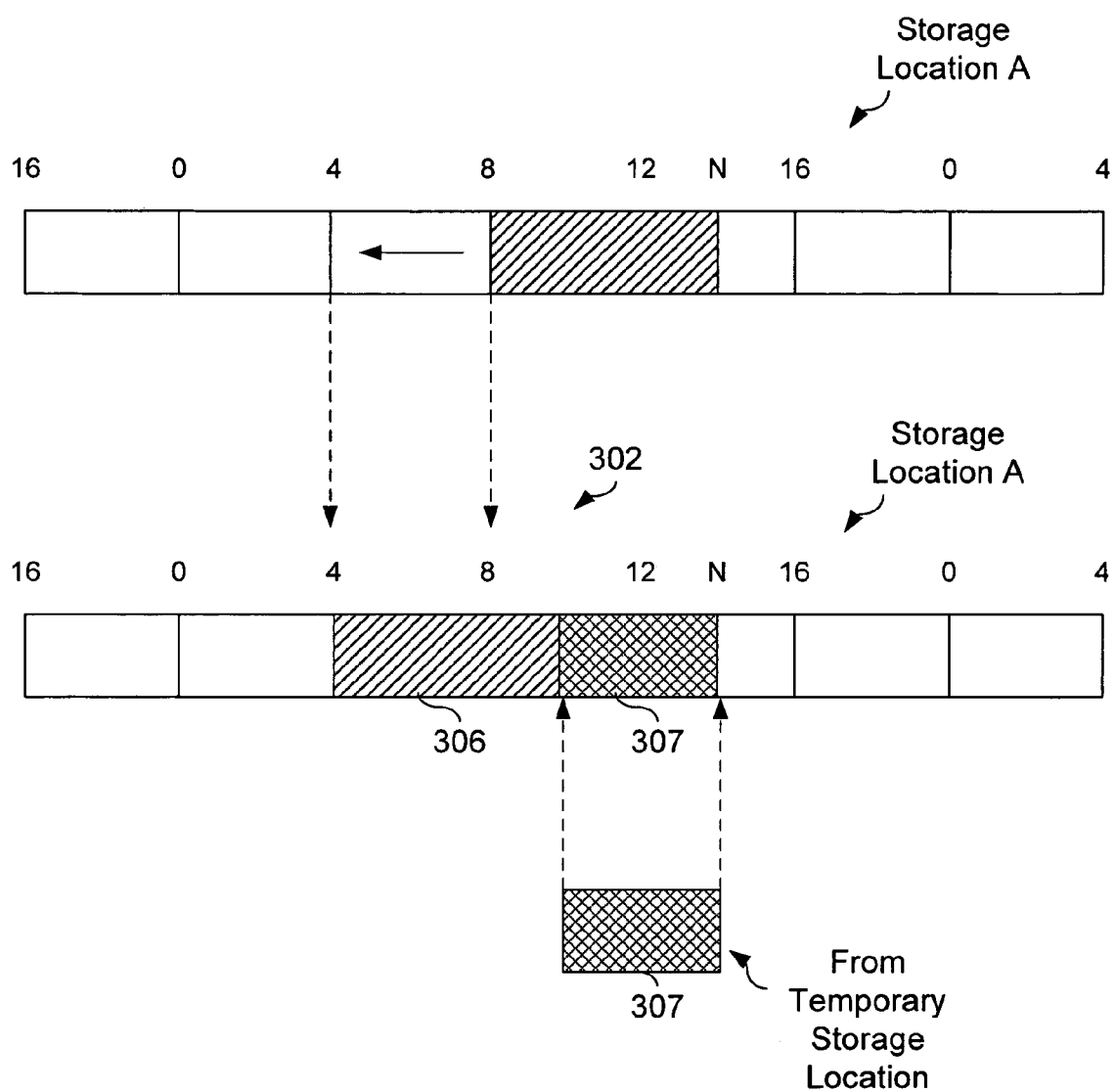

FIG. 3E illustrates the process associated with restoring data block 302 within storage location A such that there is data coherency with the original data in storage location A. This involves unshifting pre-shifted data block 306 within storage location A. Then tail 307 is retrieved from temporary storage into the tail's original location within storage location A. This restores data block 302 within storage location A from data blocks 306 and 307. FIGS. 3A-3E describe a PUT from storage location A to storage location B.

Figure 4:
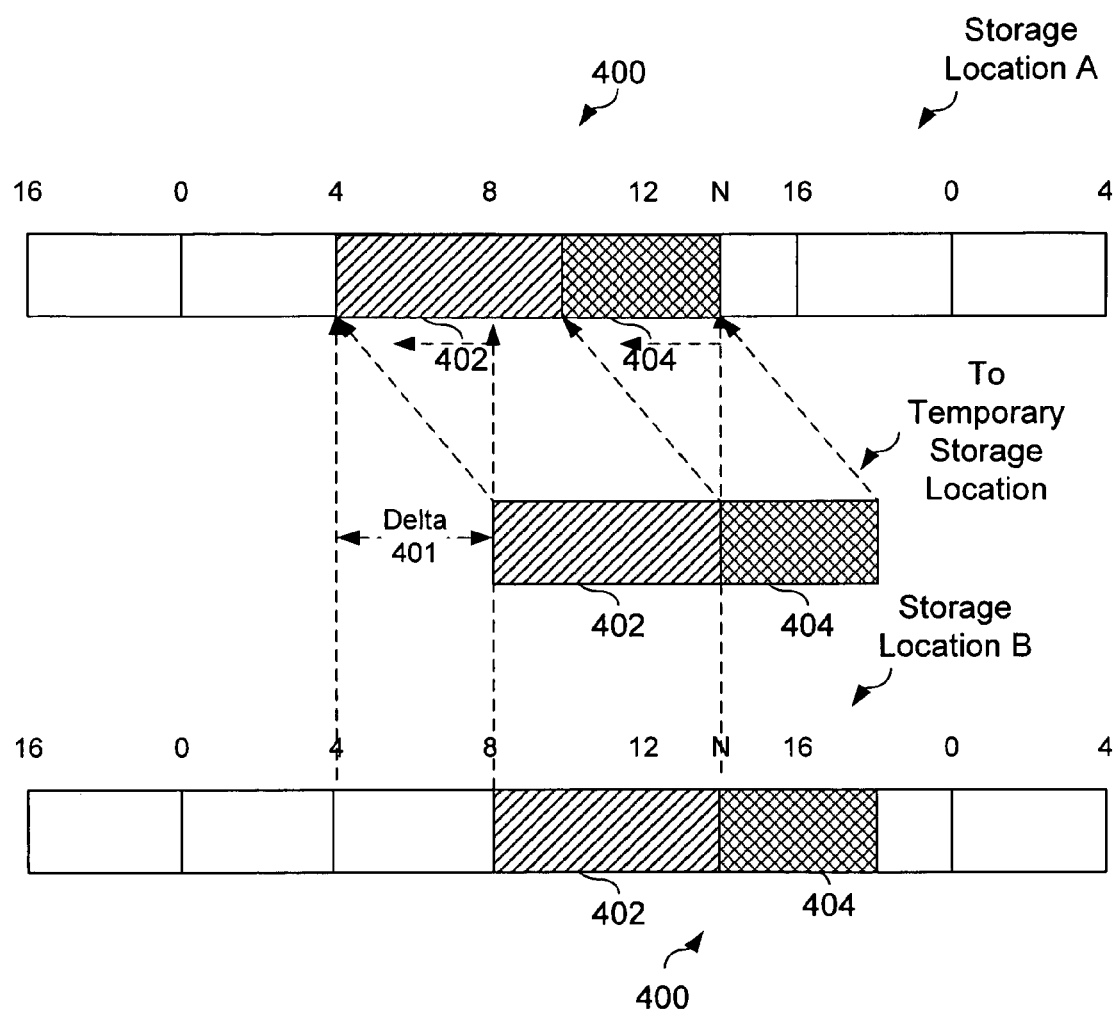
FIG. 4 may be used to describe operations associated with a misaligned DMA transfer in accordance with embodiments of the present disclosure where a fetch is performed from storage location B to storage location A.

FIG. 4 may be used to describe operations associated with a misaligned DMA transfer in accordance with embodiments of the present disclosure where a fetch is performed from storage location B to storage location A. This fetch of N bytes of data within data block 400 involves a similar process as described with reference to FIGS. 3A through 3E. First the starting location of data block 400 within storage location B and the intended starting location within storage location A is determined to provide a delta 401. Delta 401 is used to divide data block 400 into a first portion or block 402 and a tail 404. The first portion or block 402 may be transferred via DMA directly to storage location A. Once in storage location A, block 402 may then be shifted to the intended starting location within storage location A. To prevent any data overruns the tail within temporary storage location may be written to storage location A after block 402 has been shifted to the intended starting location within storage location A.

Figure 5:
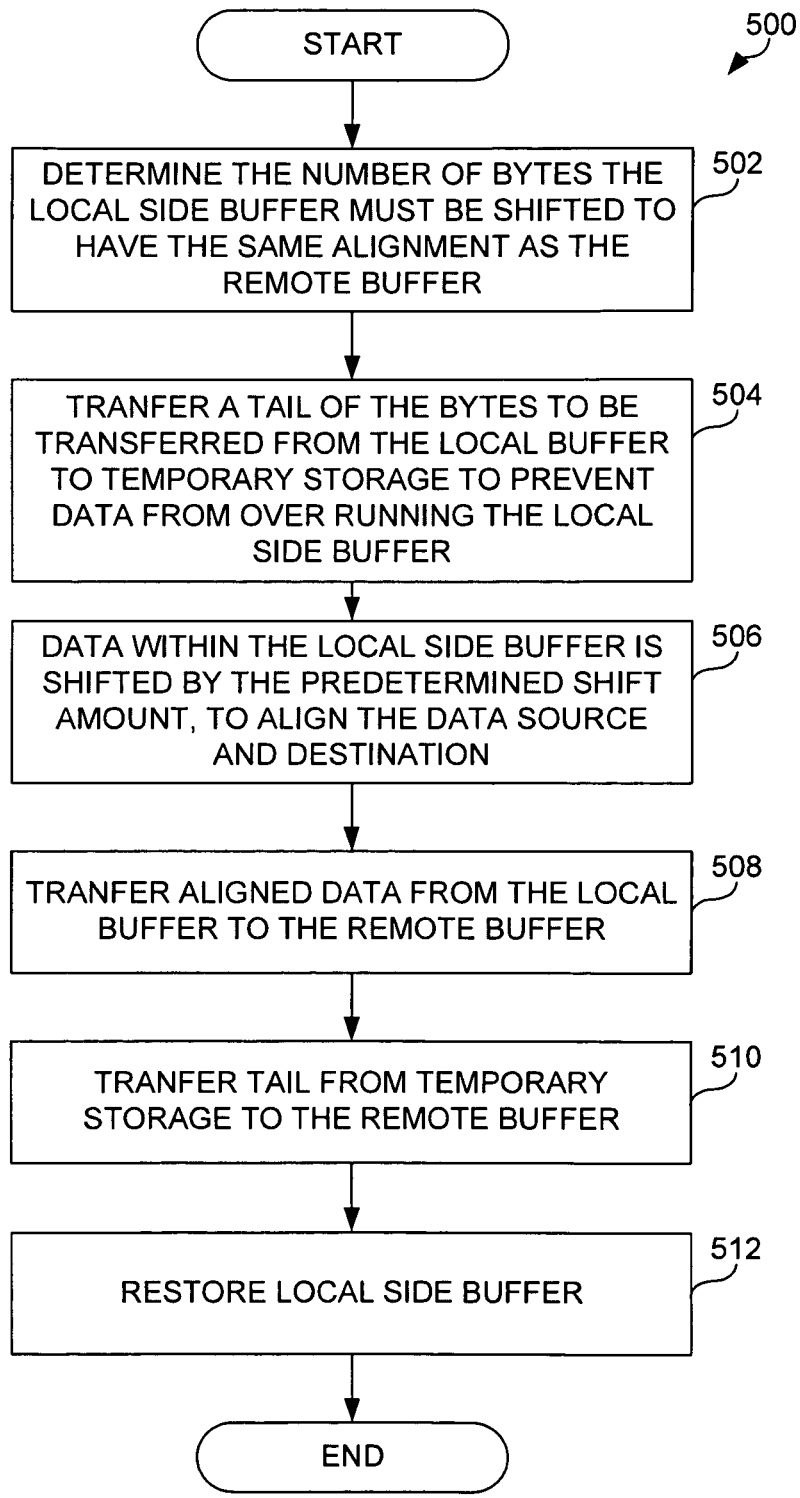
FIG. 5 provides logic flow diagram associated with a misaligned DMA transfer in accordance with the embodiments of the present disclosure.

FIG. 5 provides logic flow diagram associated with a misaligned DMA transfer in accordance with the embodiments of the present disclosure. Operations 500 of the logic flow diagram begin in block 502 by determining a number of bytes the local side buffer must be shifted to have the same alignment as the remote buffer. A tail is transferred from the local buffer to temporary storage in block 504 to prevent data from overrunning the local side buffer as the data within the local side buffer is shifted in block 506 by a predetermined shift amount based on the delta between the starting locations within the local side buffer and the remote buffer. In block 508 aligned data from the local side buffer may be transferred via DMA to the remote buffer. In block 510 the tail from temporary storage may be transferred to the remote buffer. This completes the transfer of the data from the local side buffer to the remote buffer. However, this has not yet restored the local side buffer to the buffer's original condition. Block 512 unshifts the pre-shifted data within the local side buffer and then restores the tail from temporary storage to the local side buffer in order to restore the local side buffer to the buffer's original condition.

Figure 6:
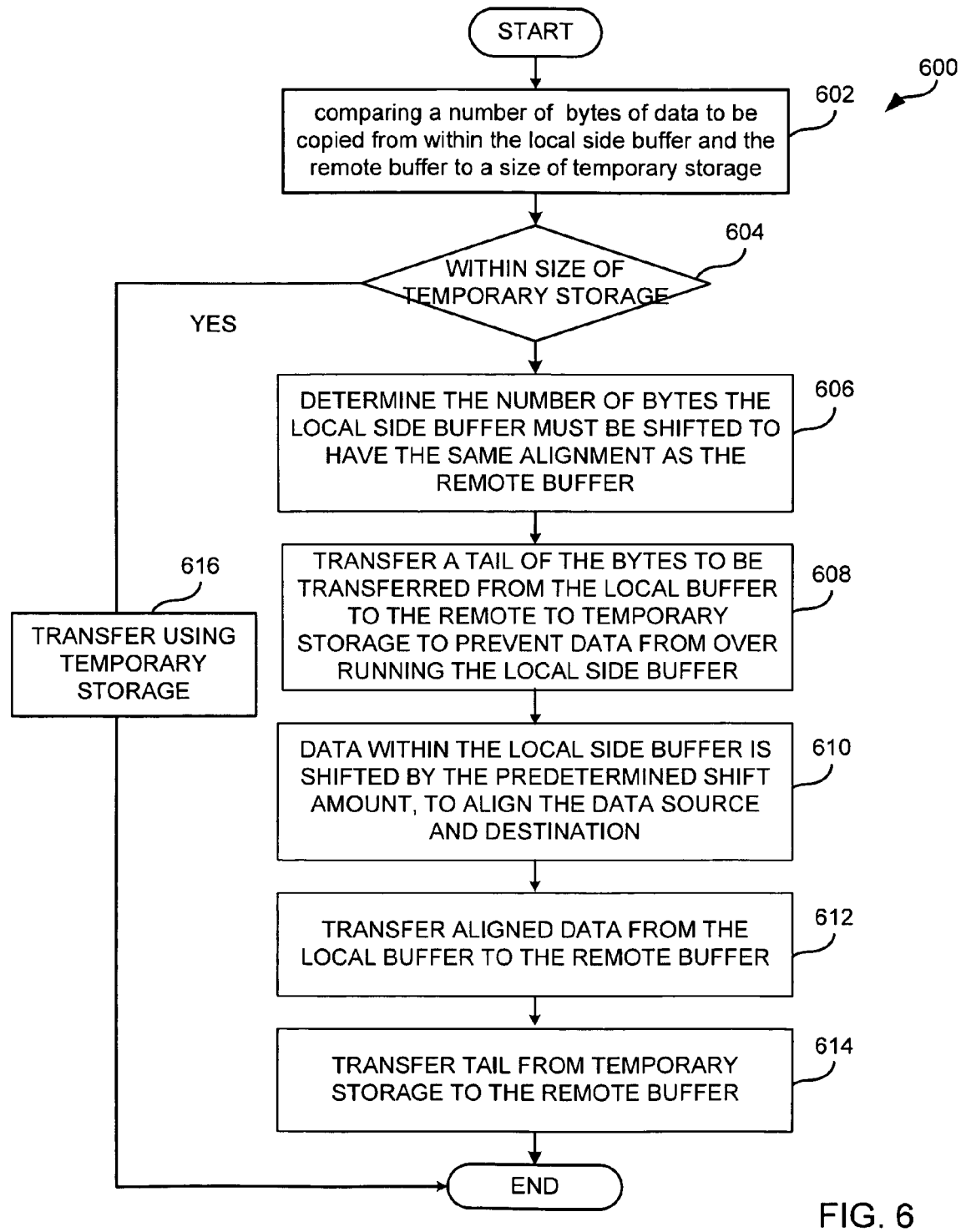
FIG. 6 provides another logic flow diagram associated with a misaligned DMA transfer in accordance with the embodiments of the present disclosure.

FIG. 6 provides another logic flow diagram describing the processes associated with transferring misaligned DMA data between a first and second storage location in accordance with the embodiments of the present disclosure. First a determination may be made as to whether or not the data is misaligned. If the data is not misaligned a DMA transfer may be initiated without further shifting or the use of temporary storage. Otherwise operations 600 began with block 602 where a comparison is made between a number of bytes to be copied from the local side buffer to the remote buffer with the size of a temporary storage location. At decision point 604, if the number of bytes is within the size constraints of the temporary storage location, the process may involve directly transferring the data from the local side buffer to temporary storage and then writing the data in the data's entirety from temporary storage to the remote buffer using only the temporary storage. This process does not involve the shifting of data within the local side buffer. However, if at decision point 604 the size of the number of bytes to be transferred is not within the capacity of the temporary location, block 606 will determine the number of bytes the local side must be shifted in block 610 to have the same alignment as the remote buffer (i.e., determining the delta between the starting locations of the local side and remote side buffers). Then a tail based on the delta may be transferred to the temporary storage location to prevent the shifting of data in block 608 from overrunning the local side buffer. In block 612, the aligned data is transferred from the local buffer to the remote buffer. Then in Step 614 the tail from temporary storage may be transferred to the remote buffer. Not shown is the restoration of the local side buffer as discussed previously with reference to FIG. 5.

A similar situation to be addressed is associated with the front end of the data blocks to be transferred. Some systems require that data blocks be transferred as entire words. If the data block does not begin at a demarcation between words, copying the entire data block will raise the possibility that when the data is restored to the local side buffer writing the original word taken from the front end may cause a read-modify-write condition where the tail end of the prior data block is corrupted due to the front end of the data block to be transferred. By writing a partial word to temporary storage within the front end this situation may be avoided such that there is no rewriting of a partial word prior to the front end of the data block.

Embodiments of this disclosure break up a single DMA request into smaller manageable/aligned parts using a combination of the user's incoming or outgoing DMA buffer with a small amount of temporary storage. There are two parts to this functionality, the first part aligns the source and destination addresses and the second part breaks the DMA up into manageable alignment sizes. If the source and destination DMA addresses have the same alignment then the first part is not necessary. In addition, both front and back end temporary buffers may be used to minimize read-modify-write race conditions.

In handling misaligned source and destination buffers only the local side buffers are manipulated. Re-alignment is based on the architecture specific alignment size, such as 16 bytes. If re-alignment is necessary one may determine the number of bytes the local side buffer must be shifted right in order to have the same alignment as the remote buffer. In re-using the local side buffer, special care must be taken not to overrun the user supplied buffer and to minimize read-modify write race conditions, both of which could cause data corruption. On the front of the DMA, any data that does not consume the entire DMA block is copied to a temporary storage area. In addition, any data that would be shifted out the end of the local DMA buffer or does not occupy an entire DMA block at the tail of the buffer is also copied to temporary storage. The temporary storage is aligned on the architecture specific alignment boundary. For example, in one embodiment, each temporary buffer is 32 bytes and is aligned on a 16 byte boundary.

The data alignment of the front-end temporary storage is the same as the beginning of the remote buffer. The starting address of the shifted user buffer data is equal to the local buffer address incremented by the sum of the front-end buffer length plus the shift amount. The data alignment of the tail-end temporary storage is equal to the alignment of the remote buffer address incremented by the sum of the front end buffer data plus the length of the shifted user buffer data.

If the DMA operation is a PUT from the local buffer to the remote, then the data within the user's supplied buffer is shifted right, by the predetermined shift amount, to give the source and destination the same alignment. A DMA starting at the locally shifted address is performed to/from the remote buffer. If the DMA operation was a PUT, then the pre-shifted data is transferred from the local shifted data start address to the beginning of the remote buffer.

If the DMA operation was a GET, then the beginning of the remote buffer is transferred to the local buffer address shifted right by the predetermined amount. A DMA starting at the aligned offset within the front-end temporary storage is performed to/from the remote buffer.

If the DMA operation was a PUT, then the front-end buffer data is transferred from the start of the copied data to the beginning of the remote buffer. If the DMA operation was a GET, then the beginning of the remote buffer is transferred to the front-end temporary buffer at the same alignment byte offset.

A DMA starting at the aligned offset within the tail-end temporary storage is performed to/from the remote buffer. If the DMA operation was a PUT, then the local temporary buffer data is transferred from the start of the copied data to the matching offset location in the remote buffer. If the DMA operation was a GET, then the overrun truncated tail of the remote buffer is transferred to the local temporary buffer at the same alignment byte offset.

Once the DMAs are complete, the local buffer data is shifted back into the data's original location. For a PUT operation, this step restores the data to the data's original state. For a GET operation, this step is moving the data to the data's intended destination.

The front and tail end temporary buffer data is copied into the appropriate locations within the user's buffer.

In addition to there being source and destination alignment restrictions, there can also be size alignment restrictions. For example, in one embodiment DMAs less than 16 bytes must be naturally aligned with the DMA address. DMA sizes greater than 16 bytes must be in 16 bytes multiples with 16 byte aligned addresses.

A size mask may be used to breakdown the DMA size/address dependency. The first step is to perform small sized DMAs (less than alignment size) to get DMA addresses to an aligned boundary. In this embodiment, this is any size less than 16 bytes. Each of the first 4 mask element values is used, in order, to align the DMA addresses. If the DMA address aligned with the mask element is non-zero then a DMA of the mask element size is performed. On each DMA performed the addresses are increased by the element value and the size is decreased by the value.

Once the DMA addresses are aligned, larger sized DMAs can be performed without regards to the address. Starting at the next mask element, one can loop through the remaining elements, in order, breaking off larger to smaller DMAs. Each mask element is aligned with the remaining size, if non-zero then a DMA of the masked amount is performed. If the masked amount exceeds the maximum architecture supported DMA size, then only this maximum is performed. Each DMA performed the addresses are increased by the masked value and the size is decreased by the masked value.

In summary, the present disclosure provides embodiments of a system and method operable to manage misaligned DMA addresses. In one embodiment this method involves determining a delta between N bytes of data to be copied from within a local side buffer (source location) to a remote buffer (destination location). After the delta is determined a tail of the same length is copied to temporary storage. The N bytes of data on the local side buffer minus the tail will be shifted to align the N bytes of data to be copied from within the local side buffer to the starting address of the destination location in the remote buffer. The pre-shifted N bytes of data within the local side buffer may be DMA transferred to the remote buffer. The tail transferred to temporary storage may then be copied from temporary storage to the remote buffer As one of average skill in the art will appreciate, the term "substantially" or "approximately", as may be used herein, provides an industry-accepted tolerance to the term's corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust the signal's current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The invention claimed is:

1. A method comprising:
   determining a delta between N bytes of data to be copied from a local side buffer to a remote buffer, the delta being a misalignment of a starting location of a data block within the local side buffer and an intended starting location within the remote buffer;
   copying a tail of the N bytes of data within the local side buffer to temporary storage, the tail comprising a trailing number of bytes of the N bytes of data that would overrun the local side buffer if the N bytes of data were shifted in the local side buffer by the delta;
   shifting the N bytes of data to be copied from within the local side buffer minus the tail in the local side buffer to align the N bytes of data to be copied from within the local side buffer minus the tail to the remote buffer;
   transferring the N bytes of data to be copied from within the local side buffer minus the tail to the remote buffer; and
   transferring the tail from the temporary storage to the remote buffer.

2. The method of claim 1, wherein shifting the N bytes of data to be copied from within the local side buffer minus the tail does not overrun an original location of the N bytes of data within the local side buffer.

3. The method of claim 1, further comprising:
   shifting the shifted N bytes of data to be copied from within the local side buffer minus the tail to an original location within the local side buffer; and
   transferring the tail from temporary storage to the original location within the local side buffer.

4. The method of claim 1, wherein transferring the N bytes of data to be copied from within the local side buffer minus the tail to the remote buffer comprises a direct memory access (DMA) transfer.

5. The method of claim 1, wherein a starting address of shifted N bytes of data to be copied from within the local side buffer is equal to the local buffer address incremented by a delta between N bytes of data to be copied from within the local side buffer and the remote buffer.

6. The method of claim 1, further comprising:
   comparing a number of bytes of data to be copied from within the local side buffer and the remote buffer to a size of the temporary storage; and
   transferring the N bytes of data to be copied from within the local side buffer to the temporary storage when the number of bytes of data to be copied from within the local side buffer and the remote buffer is within a capacity of the temporary storage.

7. A method comprising:
   comparing a number of bytes of data to be copied from a local side buffer to a remote buffer to a size of temporary storage;
   when the number of bytes of data to be copied from the local side buffer to the remote buffer is not within a capacity of the temporary storage:
     determining a delta between N bytes of data to be copied from the local side buffer to the remote buffer, the delta being a misalignment of a starting location of a data block within the local side buffer and an intended starting location within the remote buffer;
     copying a tail of the N bytes of data within the local side buffer to the temporary storage, the tail comprising a trailing number of bytes of the N bytes of data that would overrun the local side buffer if the N bytes of data were shifted in the local side buffer by the delta;
     shifting the N bytes of data to be copied from within the local side buffer minus the tail in the local side buffer to align the N bytes of data to be copied from within the local side buffer minus the tail to the remote buffer;

transferring the N bytes of data to be copied from within the local side buffer minus the tail to the remote buffer; and transferring the tail from the temporary storage to the remote buffer; and when the number of bytes of data to be copied from within the local side buffer and the remote buffer is within the capacity of the temporary storage:

transferring the N bytes of data to be copied from within the local side buffer to the temporary storage; and transferring the N bytes of data to be copied from within the temporary storage to the remote buffer.

8. The method of claim 7, wherein shifting the N bytes of data to be copied from within the local side buffer minus the tail does not overrun an original location of the N bytes of data within the local side buffer.

9. The method of claim 7, further comprising:

shifting the shifted N bytes of data to be copied from within the local side buffer minus the tail to an original location within the local side buffer; and transferring the tail from the temporary storage to the original location within the local side buffer.

10. The method of claim 7, wherein transferring the N bytes of data to be copied from within the local side buffer minus the tail to the remote buffer comprises a direct memory access (DMA) transfer.

11. The method of claim 7, wherein a starting address of shifted N bytes of data to be copied from within the local side buffer is equal to the local buffer address incremented by a delta between N bytes of data to be copied from within the local side buffer and the remote buffer.

12. A system comprising:
a primary processing device;
a first memory storage location;
a second memory storage location;
a temporary memory storage location; and
a data bus coupled to the primary processing device, the first memory storage location, the second memory storage location, and the temporary memory storage location, wherein:
the primary processing device coordinates direct memory access (DMA) data transfers between the first memory storage location and the second memory storage location using the temporary memory storage location; and
the primary processing device operable to direct:
determining a delta between N bytes of data to be copied from the first memory storage location to the second memory storage location, the delta being a misalignment of a starting location of a data block within the first memory storage location and an intended starting location within the second memory storage location;
copying a tail of the N bytes of data within the first memory storage location to the temporary memory storage location, the tail comprising a trailing number of bytes of the N bytes of data that would overrun the first memory storage location if the N bytes of data were shifted in the first memory storage location by the delta;
shifting the N bytes of data to be copied from within the first memory storage location minus the tail in the first memory storage location to align the N bytes of data to be copied from within the first memory storage location minus the tail to the second memory storage location;

transferring the N bytes of data to be copied from within the first memory storage location minus the tail to the second memory storage location; and transferring the tail from the temporary memory storage location to the second memory storage location.

13. The system of claim 12, wherein shifting the N bytes of data to be copied from within the first memory storage location minus the tail does not overrun an original location of the N bytes of data within the first memory storage location.

14. The system of claim 12, wherein the primary processing device is further operable to direct:

shifting the shifted N bytes of data to be copied from within the first memory storage location minus the tail to an original location within the first memory storage location; and transferring the tail from the temporary memory storage location to the original location within the first memory storage location.

15. The system of claim 12, wherein transferring the N bytes of data to be copied from within the first memory storage location minus the tail to the second memory storage location comprises a direct memory access (DMA) transfer.

16. The system of claim 12, wherein a starting address of shifted N bytes of data to be copied from within the first memory storage location is equal to the local buffer address incremented by a delta between N bytes of data to be copied from within the first memory storage location and the second memory storage location.

17. The system of claim 12, wherein the primary processing device is further operable to direct:

comparing a number of bytes of data to be copied from within the first memory storage location and the second memory storage location to a size of the temporary memory storage location; and transferring the N bytes of data to be copied from within the first memory storage location to the temporary memory storage location when the number of bytes of data to be copied from within the first memory storage location and the second memory storage location is within a capacity of the temporary memory storage location.

18. A system comprising:
a primary processing device;
an additional processing device;
a first memory storage location;
a second memory storage location;
a temporary memory storage location; and
a data bus coupled to the primary processing device, the additional processing device, the first memory storage location, the second memory storage location, and the temporary memory storage location, wherein:
the primary processing device coordinates direct memory access (DMA) data transfers of queue data between the first memory storage location and the second memory storage location using temporary storage location; and
the primary processing device operable to direct:
determining a delta between N bytes of data to be copied from the first memory storage location to the second memory storage location, the delta being a misalignment of a starting location of a data block within the first memory storage location and an intended starting location within the second memory storage location;
copying a tail of the N bytes of data within the first memory storage location to the temporary memory storage location, the tail comprising a trailing number of bytes of the N bytes of data that would overrun the first memory storage location if the N bytes of data were shifted in the first memory storage location by the delta;

shifting the N bytes of data to be copied from within the first memory storage location minus the tail within the first memory storage location to align the N bytes of data to be copied from within the first memory storage location minus the tail to the second memory storage location;

transferring the N bytes of data to be copied from within the first memory storage location minus the tail to the second memory storage location; and transferring the tail from the temporary memory storage location to the second memory storage location.

19. The method of claim 1, wherein:

copying the tail of the N bytes of data within the local side buffer to the temporary storage prevents an overrun of the local side buffer when shifting the N bytes of data minus the tail in the local side buffer; and wherein transferring the N bytes of data to be copied from within the local side buffer minus the tail to the remote buffer comprises a direct memory access (DMA) transfer; and further comprising:

comparing a number of bytes of data to be copied from within the local side buffer to the remote buffer to a size of the temporary storage; and when the number of bytes of data to be copied from within the local side buffer to the remote buffer is not within a capacity of the temporary storage, determining the delta.

* * * * *